United States Patent Office 3,205,709
Patented Sept. 14, 1965

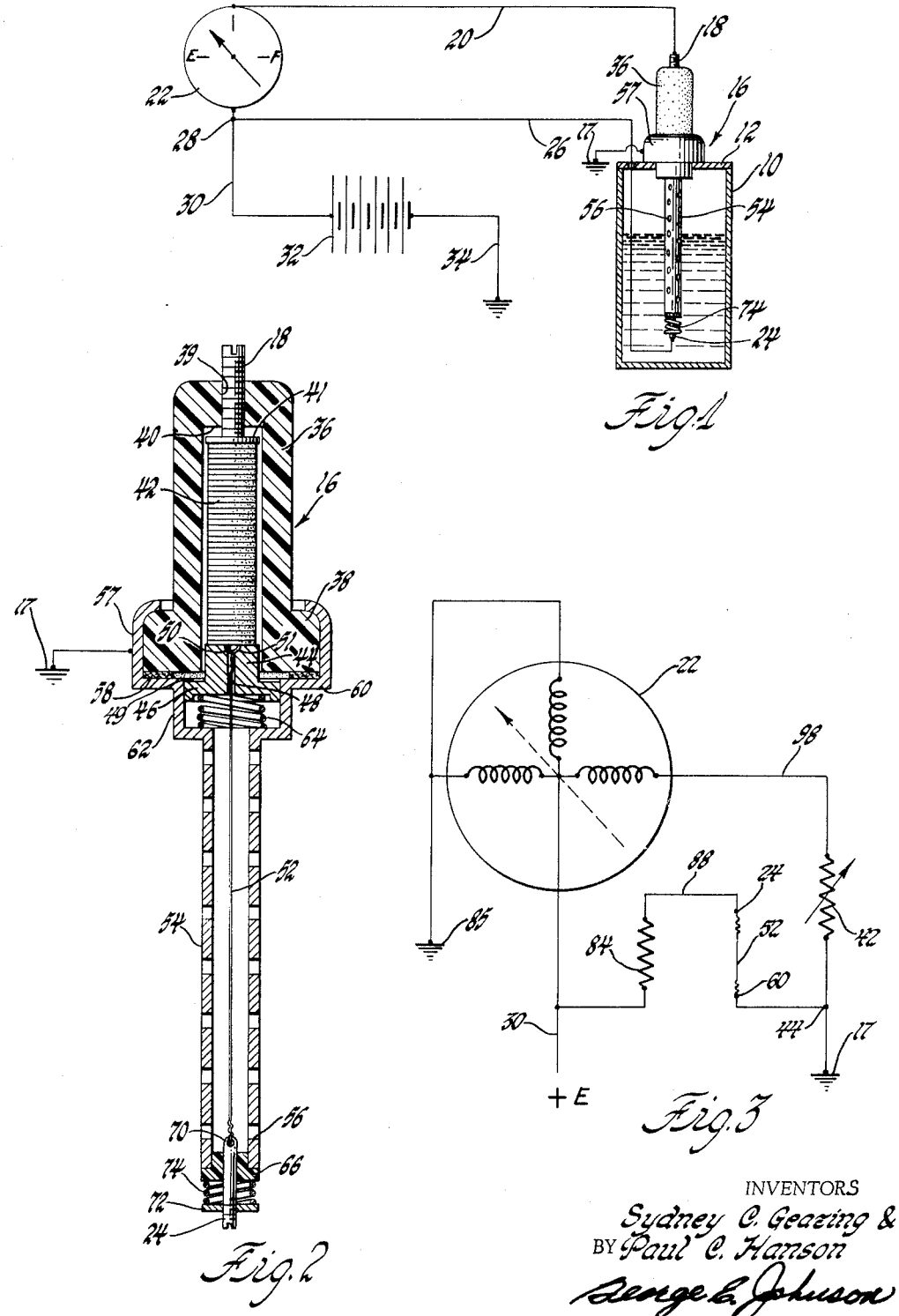

3,205,709
THERMOELECTRIC TRANSDUCER
Sydney C. Gearing, Grand Blanc, and Paul C. Hanson,
Flint, Mich., assignors to General Motors Corporation,
Detroit, Mich., a corporation of Delaware
Filed Nov. 28, 1962, Ser. No. 240,696
1 Claim. (Cl. 73—295)

This invention relates to transducers and particularly to an electric transducer especially suited for use with a gage in determining a condition such as liquid level, temperature or a change in the identity of a fluid or the proportions of components thereof.

An object of the present invention is to provide an improved electrical transducer in which impedance will vary in accordance with a variation in a condition such as liquid level so that a conventional gage may be utilized to measure a current passing through the transducer and, therefore, a condition then obtaining. Another object of the invention is to provide a transducer of simple and inexpensive construction and adaptable to detect a condition or a change in condition such as the level or change in level of a liquid body.

A feature of the present invention is a tensioned wire in combination with electrical impedance means through which an electrical current may be passed in accordance with a length of wire immersed in a fluid the temperature, nature or level of which is to be indicated.

These and other important features of the invention will now be described in detail in the specification and then pointed out more particularly in the appended claim.

In the drawings:

FIGURE 1 is a diagrammatic view of a liquid level measuring system in which a transducer embodying the present invention is employed and which transducer includes a resistance wire adapted to transmit heat to a liquid;

FIGURE 2 is a sectional view of the transducer shown in FIGURE 1 as drawn to a larger scale; and FIGURE 3 is a diagrammatic view of suitable and more detailed circuitry for a conventional gage and in which circuitry the transducer of FIGURE 2 is operable in accordance with a change in wire temperature due to a change in the condition of a fluid to which the wire is exposed.

In FIGURE 1, a liquid supply tank is depicted at 10 and supported on the cover 12 of the tank is a transducer indicated generally at 16 and the casing of which is grounded as at 17. An upper terminal 18 of the transducer is connected by a line 20 to a conventional gage 22 and a bottom terminal 24 of the transducer is connected by means of a line 26 to another terminal of the gage 22. The line 26 is also connected at 28 to a line 30 leading to a voltage supply such as battery 32. This battery is grounded by a line 34.

The transducer 16 comprises a housing 36 which is of insulation material such as plastic. This housing bears at one end an annular enlargement 38 and a threaded opening 39 at the other end for retaining the threaded terminal 18. The housing 36 is recessed as at 40 to enclose a stack of pressure sensitive conductive disks 42 commonly known as a carbon pile. A metal end disk 41 is inserted between the lower end of the terminal 18 and the top disk of the pile. The lower end of the pile 42 is sustained within the recess 40 by a pressure pad 44. This pad is of conductive material and bears an annular flange 46 as well as a central perture 48. This aperture is enlarged as at 50 for retaining an expanded end element 51. This end element is made integral with a tensioned resistance wire 52 preferably of the Chromel or Nichrome type and which passes down through the center aperture 48. With the pad 44 in contact with the pile 42 a small space 49 is maintained between the flange 46 and the housing 36.

A brass tube 54 in the form of a probe and bearing apertures 56 along its length is formed with an enlarged end portion 57 rolled over the annular portion 38 of the housing 36. A yieldable gasket 58 is inserted between the radial wall 60 of the tube 54 and the lower end of the housing 36 making a tight firm junction between the two. A smaller enlargement 62 of the tube 54 is formed slidingly to retain the flange 46 and also to enclose a coil spring 64 urging the pad upwardly against the carbon pile. The lower end of the tube 54 bears an insulator plug 66 carrying the second terminal 24 and the latter is in sliding relation with the plug 66 and its upper end is connected as at 70 with the lower end of the wire 52. The terminal 24 also carries a disk 72 which is threaded thereon for retaining a coil spring 74 against the plug 66 and in compression.

The type of gage shown at 22 may be varied but it should be such as to measure a current passing through the transducer 16 as an indication of the level of the liquid in the tank 10 or whatever condition of a fluid which is to be indicated. With the transducer placed in liquid, as shown in FIGURE 1, the liquid is in intimate contact with the wire 52 for a portion of the length of that wire dependent upon the liquid level. The greater the length of the wire 52 which is immersed in the liquid, the greater will be the heat transfer of heat generated in the wire by the current and the more the wire will contract to relieve pressure on the carbon pile 42. This will effect the required variation in current to render the gage 22 effective in its purpose. The degree of immersion of the wire 52 will cause the wire to expand or contract thereby compressing and decompressing the pressure sensitive pile 42 and varying the impedance thereof. Current passing through the carbon pile is measured by the gage 22 to determine the level of the liquid in the tank 10. Considerable variation in the temperature of the liquid will have little effect on the level indication.

In FIGURE 3 is depicted a more complete circuit for the thermoelectric transducer of the same type shown in FIGURES 1 and 2. The instrument 22 for measuring the current and one end of a current limiting resistor 84 are connected by the line 30 to a power supply, the instrument 22 being grounded as at 85. The other end of the resistor 84 is connected by a line 88 to the wire 52 as at terminal 24. The other end of the wire 52 is connected through the pad 44 and casing 60 to ground as at 17. This also serves as a ground for the lower end of the pile. The upper end of the pile 42 is connected by the line 98 to the instrument 22.

The tube 54 and the wire 52 obviously must be characterized by different coefficients of expansion so that the wire tension or length will change with the fluid condition under consideration. Calibration may be had by rotatably adjusting the kerfed terminals 18 and 24.

We claim:

An electrical transducer responsive to changes in liquid level, said transducer comprising an insulator housing with two terminals, a carbon pile variable electrical impedance means in said housing and connected to one of said terminals, a thermally extensible and contractable wire connecting said impedance means to the other of said terminals, a spring means placing said carbon pile impedance means under compression and said wire being arranged to control the loading of said spring means, a probe holding said wire in tension with the length of said wire exposed, one end of said probe being fixed to one end of said housing, the coefficient of expansion of said probe differing from that of said wire, and the wire as well as the arrangement being such that a variation in the length of the said wire upon immersion in a liquid will change the impedance of said means due to a variation in heat transfer from said wire in accordance with the degree of immersion.

References Cited by the Examiner

UNITED STATES PATENTS 1,566,347 12/25 Shaw _____ 73—363 X
2,351,101 6/44 Brelsford _____ 73—313

FOREIGN PATENTS 513,427 10/39 Great Britain.

ISAAC LISANN, *Primary Examiner.*